United States Patent
Hehn et al.

(10) Patent No.: US 10,588,054 B2
(45) Date of Patent: Mar. 10, 2020

(54) METHOD FOR RESOURCE ALLOCATION IN A MOBILE COMMUNICATION SYSTEM AND BASE STATION AND PARTICIPANT COMMUNICATION MODULE FOR USE IN THE METHOD

(71) Applicant: VOLKSWAGEN AG, Wolfsburg (DE)

(72) Inventors: Thorsten Hehn, Wolfsburg (DE); Roman Alieiev, Stendal (DE)

(73) Assignee: Volkswagen AG (DE)

( * ) Notice: Subject to any disclaimer, the term of this patent is extended or adjusted under 35 U.S.C. 154(b) by 56 days.

(21) Appl. No.: 15/849,755

(22) Filed: Dec. 21, 2017

(65) Prior Publication Data

US 2018/0184334 A1    Jun. 28, 2018

(30) Foreign Application Priority Data

Dec. 22, 2016 (EP) .................................... 16206320

(51) Int. Cl.
*H04W 28/26* (2009.01)
*H04W 72/00* (2009.01)
(Continued)

(52) U.S. Cl.
CPC ........... *H04W 28/26* (2013.01); *H04W 16/06* (2013.01); *H04W 72/005* (2013.01);
(Continued)

(58) Field of Classification Search
None
See application file for complete search history.

(56) References Cited

U.S. PATENT DOCUMENTS

| 9,036,509 | B1 | 5/2015 | Addepalli et al. |
| 9,240,018 | B2 | 1/2016 | Ricci |

(Continued)

FOREIGN PATENT DOCUMENTS

| CN | 103765945 A | 4/2014 |
| CN | 105847037 A | 8/2016 |

(Continued)

OTHER PUBLICATIONS

Khader et al.; WirelessHART TDMA Protocol Performance Evaluation Using Response Surface Methodology; 2011 International Conference on Broadband and Wireless Computing, Communication and Applications; 2011.

(Continued)

*Primary Examiner* — Kevin D Mew
(74) *Attorney, Agent, or Firm* — Barnes & Thornburg LLP

(57) ABSTRACT

A method for resource allocation in a mobile communication system including base stations from mobile communication providers and participants from mobile communication providers, wherein each provider has assigned a dedicated spectrum for resource allocation for its own participants, wherein the participants from the providers communicate directly among each other, wherein a provider allocates a part of its dedicated spectrum for the direct communication among the participants from the providers, wherein the part of a dedicated spectrum of a provider for the direct communication among the participants from the providers is divided into sections, with each provider having been assigned at least one section of the part of the dedicated spectrum of the provider, wherein the resource allocation management functionality for allocating a part of its dedicated spectrum for the direct communication among the (Continued)

participants from the providers is shifted from provider to provider from time slice to time slice.

13 Claims, 4 Drawing Sheets

(51) Int. Cl.
*H04W 16/06* (2009.01)
*H04W 72/04* (2009.01)
*H04W 72/12* (2009.01)
*H04W 84/18* (2009.01)

(52) U.S. Cl.
CPC .... *H04W 72/0446* (2013.01); *H04W 72/0453* (2013.01); *H04W 72/121* (2013.01); *H04W 84/18* (2013.01)

(56) References Cited

U.S. PATENT DOCUMENTS

| | | | | |
|---|---|---|---|---|
| 2007/0177500 A1* | 8/2007 | Chang | ............... | H04W 72/1226 370/229 |
| 2012/0122463 A1* | 5/2012 | Chen | ................. | H04W 72/082 455/450 |
| 2013/0107831 A1* | 5/2013 | Han | ...................... | H04W 72/00 370/329 |
| 2013/0223294 A1* | 8/2013 | Karjalainen | .............. | H04L 5/14 370/277 |
| 2013/0223318 A1* | 8/2013 | Liu | ........................ | H04W 4/06 370/312 |
| 2013/0223353 A1* | 8/2013 | Liu | ...................... | H04W 76/14 370/329 |
| 2013/0225184 A1* | 8/2013 | Liu | ..................... | H04W 72/042 455/450 |
| 2013/0250928 A1 | 9/2013 | Choi et al. | | |
| 2015/0249979 A1* | 9/2015 | Kim | ..................... | H04W 76/14 370/329 |
| 2016/0044552 A1* | 2/2016 | Heo | ........................ | H04L 5/001 370/331 |
| 2016/0183286 A1* | 6/2016 | Park | ...................... | H04W 72/02 370/329 |
| 2016/0205534 A1* | 7/2016 | Fujishiro | ............. | H04W 72/048 455/434 |
| 2016/0242011 A1* | 8/2016 | Ericson | .................... | H04W 4/08 |
| 2016/0295595 A1* | 10/2016 | Chae | ..................... | H04W 72/00 |
| 2017/0041773 A1* | 2/2017 | Fujishiro | ............... | H04W 8/005 |
| 2017/0086055 A1* | 3/2017 | Klatt | ...................... | H04W 4/70 |
| 2017/0118621 A1* | 4/2017 | Sorrentino | ............ | H04W 76/14 |
| 2018/0146500 A1* | 5/2018 | Muraoka | ............... | H04W 76/14 |

FOREIGN PATENT DOCUMENTS

| | | |
|---|---|---|
| DE | 112012004771 T5 | 8/2014 |
| DE | 102014119653 A1 | 7/2015 |
| EP | 1902555 A2 | 3/2008 |
| EP | 2025126 A1 | 2/2009 |
| EP | 2413649 A1 | 2/2012 |
| EP | 2721865 A1 | 4/2014 |
| EP | 2789139 A1 | 10/2014 |
| EP | 2830340 A1 | 1/2015 |
| EP | 2858433 A2 | 4/2015 |
| EP | 2988560 A2 | 2/2016 |
| WO | 2011144418 A1 | 11/2011 |
| WO | 2016163106 A1 | 10/2016 |

OTHER PUBLICATIONS

Samsung; Discussion about inter PLMN V2X operation via PC5; 3GPP Draft; Nov. 4, 2016; vol. Ran WG2; Reno, USA.
Search Report for European Patent Application No. 17166023.6; dated Nov. 15, 2017.

\* cited by examiner

METHOD FOR RESOURCE ALLOCATION IN A MOBILE COMMUNICATION SYSTEM AND BASE STATION AND PARTICIPANT COMMUNICATION MODULE FOR USE IN THE METHOD

PRIORITY CLAIM

This patent application claims priority to European Patent Application No. 16206320.0, filed 22 Dec. 2016, the disclosure of which is incorporated herein by reference in its entirety.

SUMMARY

Illustrative embodiments relate to a method for resource allocation in a mobile communication system. Illustrative embodiments further relate to a base station and a participant communication module for the use in the method.

BRIEF DESCRIPTION OF THE DRAWINGS

An exemplary embodiment of the present disclosure is shown in the drawing and is explained in greater detail in the following description.

In the drawings.

DETAILED DESCRIPTION

Figure 1:
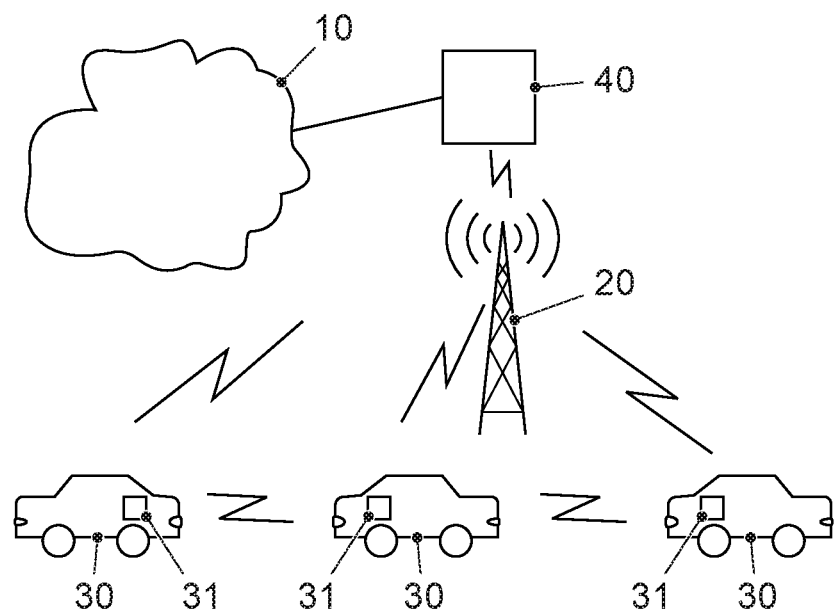
FIG. 1 illustrates an exemplary embodiment of a mobile network with LTE base station and a plurality of vehicles equipped with communication module.

For the scenario of vehicles equipped with wireless communication modules that communicate directly with each other on public roads, either for a cooperative or autonomous driving scenario, a very high reliability is very important. Techniques for vehicle-to-vehicle direct communication (V2V) have been developed and will be further developed. As an example the direct vehicle communication via WLAN may be mentioned. As an example, the decentralized option according to the WLAN standard IEEE 802.11p is being developed for V2V communications. For communication between vehicles ad hoc wireless networks are set up (Communication in the "Ad Hoc domain") according to this technique.

But also vehicle communication is possible in the field of mobile communication networks. The term mobile communication network here means a provider-based mobile communication network, in other words a centralized and managed mobile network. Another term for mobile communication network is mobile communication system, both terms are meant to be synonyms in this text. In this technique, however, the base station needs to convey the messages from vehicle to vehicle. This is the area where the communication in the so-called "Infrastructure domain" takes place. For the next generation of mobile communications, the vehicle-to-vehicle direct communication is made possible. When Long Term Evolution (LTE) technology is concerned, this option is named LTE V (for vehicle), in the 5G initiative this option is called Device-to-Device communication (D2D). This is also the range of the vehicle communication with which the present disclosure is concerned.

Typical communication scenarios are safety scenarios, traffic efficiency and infotainment scenarios. In the safety area, the following example scenarios are called: "Cooperative Forward Collision Warning", "Pre-Crash Sensing/Warning", "High Density Platooning". In these areas, the vehicles will exchange information with each other, such as position, movement direction and speed, and parameters such as size and weight. Other information important for the transfer is, e.g., intent information, such as "vehicle intends to overtake", "vehicle turns left/right", and so forth that are interesting for the cooperative driving. Here, often sensor data are transferred. If a hazard is present and the driver does not react, the car could automatically slow down, so that an accident is prevented or at least the consequences of the inevitable accident are minimized. In the area of "platooning", this is the area of driving in a convoy, it is planned, for example, a reporting back of information about an intended braking maneuver from front to back to avoid rear-end collisions.

In the field of traffic management it is mentioned: "Enhanced Route Guidance and Navigation", "Green-Light Optimal Speed Advisory" and "V2V Merging Assistance" as examples.

In the field of Infotainment Internet access is most important for a plurality of multimedia services.

The listing shows that in the safety field time-critical data transmissions take place. Therefore, the latency of the vehicle-to-vehicle communication is crucial. Latency refers to the timely transmission of the data. The data must arrive at the receiver early enough so that they may still be processed and the receiver can react accordingly.

Currently the following mobile communication technologies are applicable: 3GPP-based UMTS, HSPA, LTE, and the upcoming 5G standards. For the purpose of direct V2V-communication are mentioned LTE V and 5G D2D.

In mobile communications, resource management is a very important part to reach efficient multiple access schemes. Once periodically recurring data have to be transferred, it is more efficient to allocate transmission resources for transmission of this data, and to assign transmission resources to the sending station. This task is assigned in today's mobile phone communication standards to a management unit, which is also known under the term "scheduler". This management unit is typically placed in the base station of a mobile communication cell. In the LTE mobile communication system, the base station is briefly referred to as eNodeB, according to "evolved node basis".

So there is the situation that in the direct communication between vehicles with mobile communication (LTE-V, 5G), the transfer takes place from vehicle to vehicle, but the network provider via the base station eNodeB controls the resources. This so-called scheduling of mobile operator determines which frequency resource may be used at what time for direct communication.

The LTE-V system makes use of a centralized scheduling instance to handle contention between devices. The scheduler is responsible for the resource management of a mobile communications provider. For the LTE mobile communication system in Germany there are four providers V, T, E, O available.

Newer cellular standards (3GPP Release 12 and later, i.e., LTE-V and the coming generation 5G) soften the cellular concept to enable direct communication. The scheduler has in this form of communication still the task of resource allocation; the communication between vehicles however takes place directly, without going through the base station (so-called Sidelink traffic).

All user activities are orchestrated within the cell of the base station, for instance, in mobile communications. The scheduler is usually a software component in the base station and informs each participant, at what time and on which frequencies of the transmission frame, he is allowed to send certain data. Its main task consists in the equitable allocation of transmission resources to the various participants. Thus collisions are avoided, in both directions of transmission from a subscriber (uplink) and to a subscriber (downlink), and the traffic is regulated, allowing a more efficient access to a variety of users.

This is already complicated if all participants logged-in to a base station of one provider are to be scheduled. But the resource management is even more complicated when multiple providers have their base stations in place and all providers want to cover the same area. Along the main roads and motorways this is definitely the case. For V2V communication the participants from all providers in a certain area need to interact with each other and dependencies between operators arise. To demonstrate this, the following example is given:

Car A is with provider A. In time operation at t, provider A schedules a broadcast transmission by Car A.

All cars in the given area of interest with provider B need to hear Car A's broadcast message as well. Thus, provider B may not schedule uplink activities for his cars during time operation at t.

Right now, the standardization consortium 3rd Generation Partnership Project 3GPP considers two solutions for this problem.

Proposal A: All providers make use of one dedicated spectrum that is jointly controlled by all providers. The joint control is done, for example, through a virtual network provider. The downside of this solution is that there is a need for a fixed allocation of the dedicated spectrum range, which is difficult to obtain. The exclusive allocation of dedicated spectrum is really expensive since this spectrum range cannot be scheduled to other participants any more.

Proposal B: Each provider makes use of its own separate spectrum. All cars need to be informed by their provider on all existing V2V resources, even those used by vehicles of other providers. The downside of this solution is that each car needs to listen to multiple spectra at the same time. This calls for multiple receive chains in each car and is hence costly for the car manufacturers and the manufacturers of the car communication modules. Another drawback is that a fixed number of receive chains in the cars also limits the maximum number of simultaneous providers involved in V2V for this car.

In the LTE mobile communication system, the two following types of scheduling are utilized:

Dynamic Scheduling: This comes into play when accessing data services. Standing data (in the case of uplink on the handset or in the case of downlink at the base station), the scheduler for this transmission dynamically assigns the resources. The allocated resources are used by the transmitter for transmitting. The receiver listens to those transmission resources. The allocation of resources to the users is done such that in most mobile radio cells the total capacity of the cell is as high as possible without (e.g., at the edge of the cell) to affect individual users too much. A typical scheduling algorithm coping with such constraints is named "Channel-dependent proportionally-fair scheduling".

Semi-Persistent Scheduling: This type of scheduling is used when a user at regular intervals requires a predictable amount of resources. In practice, this form is used, for example, in telephony, e.g., Voice over LTE (VoLTE). To transfer the call transmission resources are needed, periodically. This type of scheduling requires less signaling overhead, but it can only be used for relatively static scenarios and relatively long-term resource allocation.

From EP 2 789 139 B1 a method for multi-hop forwarding of data packets in vehicular ad-hoc networks is disclosed. Each node knows both its own and the destination's geographical coordinates. The coordinates of the one-hop neighbors are obtained from periodically broadcast Cooperative-Awareness Messages (CAMs). The method comprises the following distributed coordination scheme, executed by each node upon receiving a packet: i) computing the set of candidate forwarders; ii) ranking the candidate forwarders according to a utility metric; iii) forwarding the packet after a period of time proportional to its rank if top-ranked, dropping the packet otherwise. The base utility metric used for ranking forwarders is the inverse of the distance to the destination.

From CN105847037A1 a WirelessHART-based network is proposed which is specifically adapted for the use inside a car. Such a wireless vehicle communication network can help to reduce the weight of the car by eliminating the need to install cables between the components which communicate. WirelessHART is one of the first wireless communication standards specifically designed for process automation applications.

A description of the WirelessHART network system is found in the article of Osama Khader, Andreas Willig and Adam Wolisz "WirelessHART TDMA Protocol Performance Evaluation Using Response Surface Methodology" in 2011 International Conference on Broadband and Wireless Computing, Communication and Applications of the IEEE Computer Society. The system employs a TDMA-based MAC protocol and additionally performs slow frequency hopping (hopping on a per-packet basis). The TDMA slot allocation is centrally controlled and slots are assigned at network configuration time. An individual field device receives a schedule from the network manager informing him about those time slots where it transmits and those slots where it receives. Furthermore, a field device must maintain time synchronization to agree on slot boundaries with neighbored devices.

The two existing proposals from the 3rd Generation Partnership Project 3GPP for the resource management for V2V communication have distinct drawbacks as mentioned above. There is therefore a need for an improved resource management for V2V communication in a mobile communication system which is more flexible and allows for efficient resource utilization without the need of exclusive allocation of dedicated spectrum and without the need of multiple receiver chains in the car communication module.

These are solved with a method for resource allocation in a mobile communication system and corresponding base station and participant communication module according to the independent claims 1, 8, and 9.

The dependent claims contain developments and improvements to the method and devices (base station, and participant communication module) according to the disclosure.

The proposal for resource allocation according to the disclosed embodiments is based on the idea that the mobile communication providers take turn in supplying part of their spectrum for V2V activities (Time Division Multiple Access TDMA-like Spectrum Sharing). In more detail, at a given point in time t, one pre-determined provider will reserve one part of its existing resource pool, optionally a contiguous chunk of its dedicated spectrum, for V2V usage. It will inform all other providers about this event (if the other providers do not know about it in advance) such that they can inform their participants (vehicles/devices) accordingly. The providers will agree on a method to share this resource pool among them.

In at least one disclosed embodiment the resource allocation functionality is shifted from provider to provider from time slice to time slice in a round robin state, maximum rate queuing state or proportionally fair queuing state. The proposed scheme does not limit the amount of involved providers, and allocates resources in a "fair manner" (each provider gains or shares its resources in a same or agreed manner). Another benefit is that no overall dedicated spectrum for V2V communications is required. Moreover, all vehicles require only one instead of multiple transceiver chains.

In a further disclosed embodiment each provider announces to all other providers which part of its dedicated spectrum is reserved for the direct communication among the participants from the plurality of providers.

For such disclosed embodiment, the part of the dedicated spectrum for the direct communication among the participants from the plurality of providers is hence also divided into sections, with each provider having been assigned at least one section of the part of the dedicated spectrum. This has the benefit for the "in-coverage" V2V scenario, that each provider could still schedule its own devices. Such scheduling method in other words could be referred to be a hierarchical scheduling approach.

Here, each provider announces to its own participants which section of the announced part of the dedicated spectrum is reserved for the direct communication among its own participants.

In the method for resource allocation in a mobile communication system each provider will schedule resources in its section of the part of the dedicated spectrum for its own participants by a scheduler in the provider owned base station.

In another disclosed embodiment each provider will schedule the resources in the part of the dedicated spectrum for its own participants and the participants of the other providers by a scheduler in the provider owned base station. If in this case some provider, for example, the one which owns the current common resource pool, also takes over the scheduling task for all participants from own and other providers, then such more is referred to be a "common in-coverage mode". The main drawback for all vehicles being coordinated by a single operator are the requirements on the scheduler's efficiency and performance, since each provider has to be able to handle many more users than it actually has in its own network. Additionally, the provider has to take legal responsibility for all vehicles if some serious accident happens due to a communication or scheduling problem of a given provider.

In the another disclosed embodiment, if none of the providers take over the resource scheduling control task in a currently dedicated common resource pool, then such mode is referred to be an "out of coverage" mode or more precisely "common opportunistic access mode". The selected V2V spectrum would be accessed by vehicles from different providers in an opportunistic manner within a common dedicated spectrum.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a way for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited parts are combined and brought together in the manner which the claims call for. It is thus regarded that any part that can provide those functionalities are equivalent to those shown herein.

FIG. 1 shows the system architecture for reducing a mobile communication cell to practice. Reference number 20 denotes the base station eNodeB of one LTE mobile communication service provider. There are further base stations (not shown) from other providers close to base station 20. This is definitely the case for the areas along the main roads and motorways where there is a lot of traffic. There is at least an overlap between the cells of one provider and the cells of other providers.

The base station 20 in FIG. 1 is positioned close to a main road on which cars 30 are driving. Of course, other vehicles may also drive on the road. In the terminology of LTE, a mobile terminal corresponds to user equipment UE which allows a user to access network services, connecting to the UTRAN or E-UTRAN via the radio interface. Typically, such user equipment corresponds to a smart phone. Of course, mobile terminals are also used in the cars 30 or in other vehicles. The cars 30 are equipped with an on-board unit 31. This on-board unit 31 corresponds to a LTE communication module with which the vehicle can receive mobile data and can send such data.

More generally, the Evolved Universal Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by the so-called X2 interface. The eNodeBs are also connected by the so-called S1 interface to the EPC (Evolved Packet Core), more specifically to the MME (Mobility Management Entity) by the S1-MME and to the Serving Gateway (S-GW) by the S1-U interface.

From this general architecture FIG. 1 shows that eNodeB 20 is connected to the EPC 40 via the S1 interface and that EPC 40 is connected to the Internet 10. The S1 interface may be reduced to practice with wireless communication technology such as with the help of microwave radio communication by directional antennas or wired communication technology based on fiber cables.

The various interfaces of the LTE network architecture are standardized. It is referred to the various LTE specifications which are publicly available.

Figure 2:
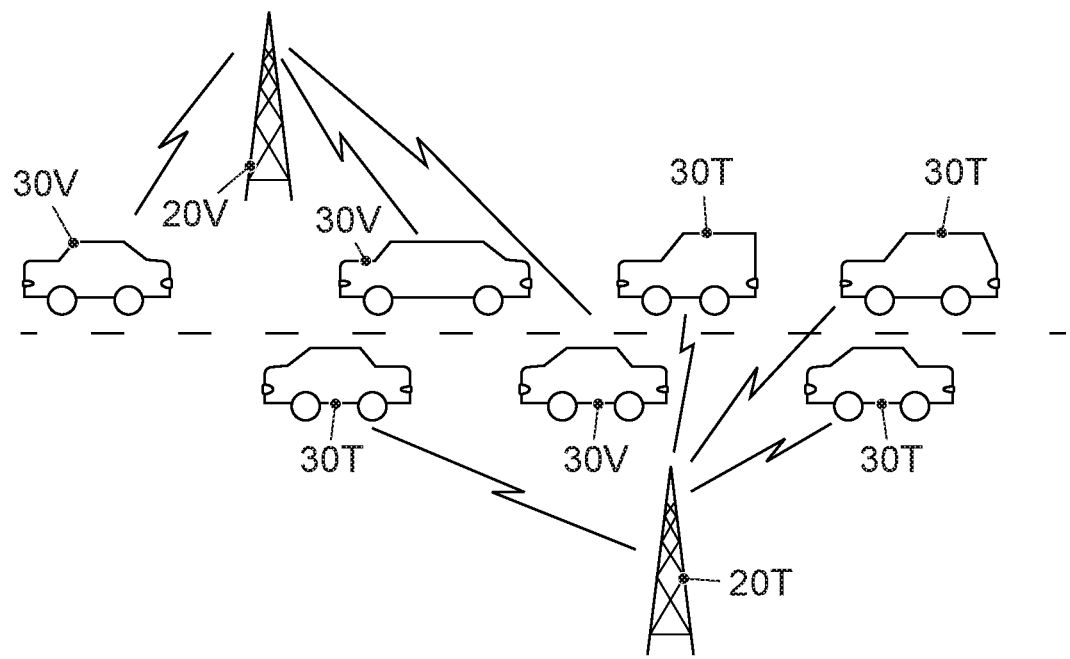
FIG. 2 illustrates an exemplary embodiment of a mobile network with two LTE base stations from different providers and a plurality of vehicles equipped with communication module, some of them being served by the base station of a first provider and the remaining vehicles being provided by the base station of the second provider.

FIG. 2 shows the typical scenario where a plurality of vehicles 30V and 30T are driving on a road. Also shown are two base stations 20V and 20T serving the depicted section of the road; i.e., the vehicles 30V are served by base station 20V and the vehicles 30T are served by base station 20T.

The today's situation for the LTE mobile communication system in Germany is that there are four providers V, T, E, O existing who have acquired their dedicated spectrum from the LTE frequency bands. All four providers serve vehicular devices based on the LTE-V standard. So in general, there could be even more base stations existing serving the same road section. For the four providers V, T, E, O four base stations would be sufficient to serve all the vehicles driving on the road section.

Figure 3:
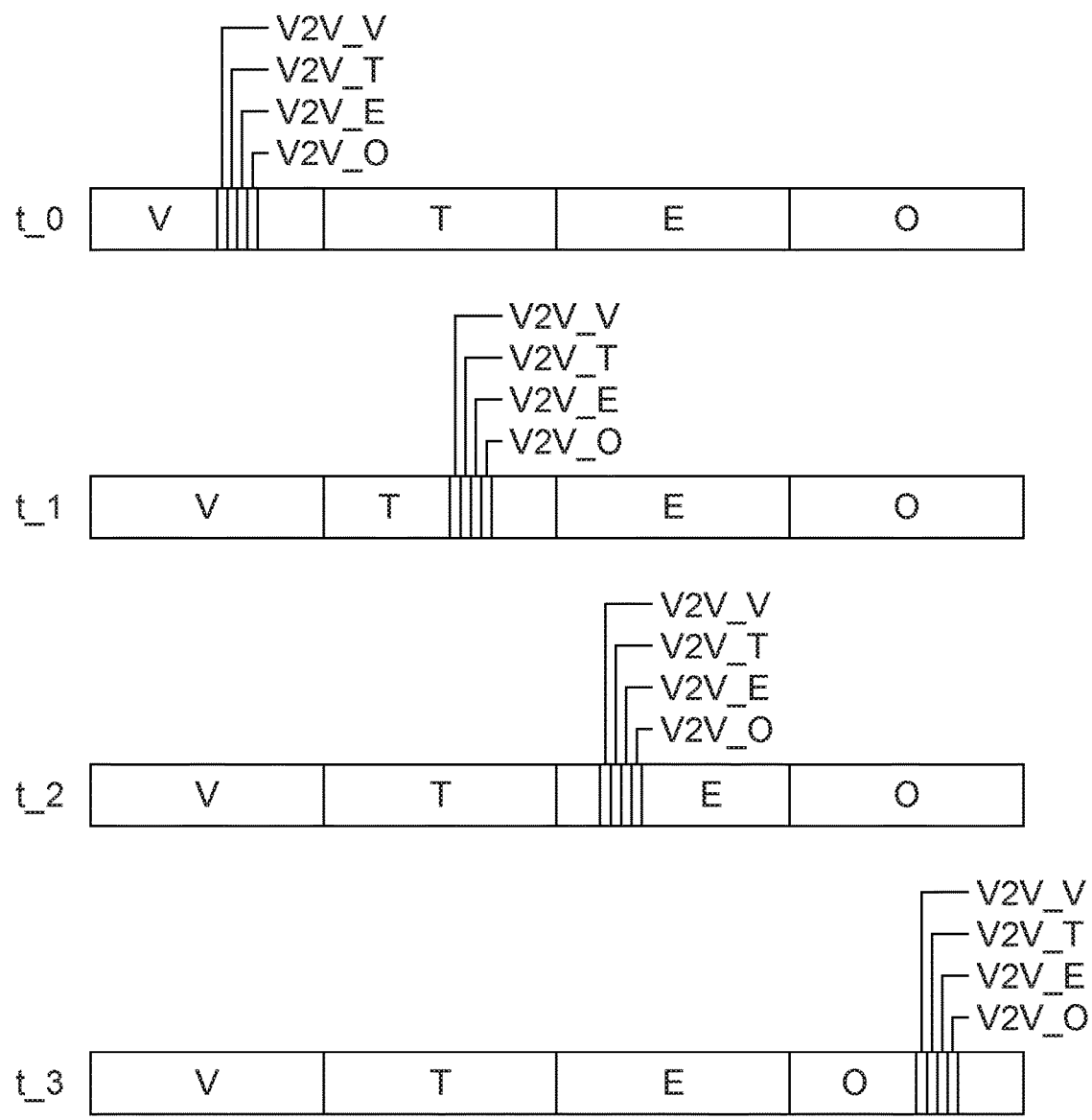
FIG. 3 illustrates in a first embodiment how a part of a dedicated spectrum in the LTE frequency bands, which is allocated for V2V communication, is shifted from provider spectrum to provider spectrum per time slice.

The conception according to a first disclosed embodiment is illustrated in FIG. 3.

Under this concept, the resource allocation management is shifted from provider to provider.

At time $t\_0$, provider V dedicates part of its resources to the V2V functionality. Provider V needs to inform the other providers which part (V2V) of its dedicated spectrum (V, T, E, O) is reserved for the direct communication among the participants from the plurality of providers. This may be done over the S1 interface. Provider V and all other providers T, E, O inform their associated vehicles about the availability of this spectrum. The resources dedicated to V2V functionality will be shared between the four providers which will in turn share their slice among their customers. FIG. 3 illustrates that the dedicated spectrum from provider V at time $t\_0$ is divided into four portions V2V_V, V2V_T, V2V_E, V2V_O for the four providers V, T, E, O. At time $t\_0$ no other provider is required to allocate resources for V2V communication from their own spectra. The resources in the dedicated spectrum V2V_V will be scheduled by the base station of provider V. The resources in the dedicated spectrum V2V_T will be scheduled by the base station of provider T. The resources in the dedicated spectrum V2V_E will be scheduled by the scheduler in the base station of provider E. The resources in the dedicated spectrum V2V_O will be scheduled by the scheduler in the base station of provider O.

At the next time operation at $t\_1$, provider T will dedicate part of its spectrum to V2V functionality. Here, the dedicated spectrum from provider T at time $t\_1$ is divided into four portions V2V_V, V2V_T, V2V_E, V2V_O for the four providers V, T, E, O.

At the next time operation at $t\_2$, provider E will dedicate part of its spectrum to V2V functionality. Again, the dedicated spectrum from provider E at time $t\_2$ is divided into four portions V2V_V, V2V_T, V2V_E, V2V_O for the four providers V, T, E, O.

Likewise, at the next time operation at $t\_3$, provider O will dedicate part of its spectrum to V2V functionality. Here, the dedicated spectrum from provider T at time $t\_3$ is divided into four portions V2V_V, V2V_T, V2V_E, V2V_O for the four providers V, T, E, O. As can be seen in FIG. 3 each provider may select on its own discretion which part of its spectrum will be allocated for V2V communication.

As illustrated in FIG. 3 the responsibility of resource allocation for V2V communication is shifted from provider to provider according to a simple Round Robin scheme. In other disclosed embodiments the pattern defining the provider responsible for V2V functionality can follow a different scheme, e.g., maximum rate or proportionally fair queuing. Such mode according to FIG. 3 could briefly be called "in-coverage" V2V communication mode since each vehicle remains to be scheduled by its own provider.

Figure 4:
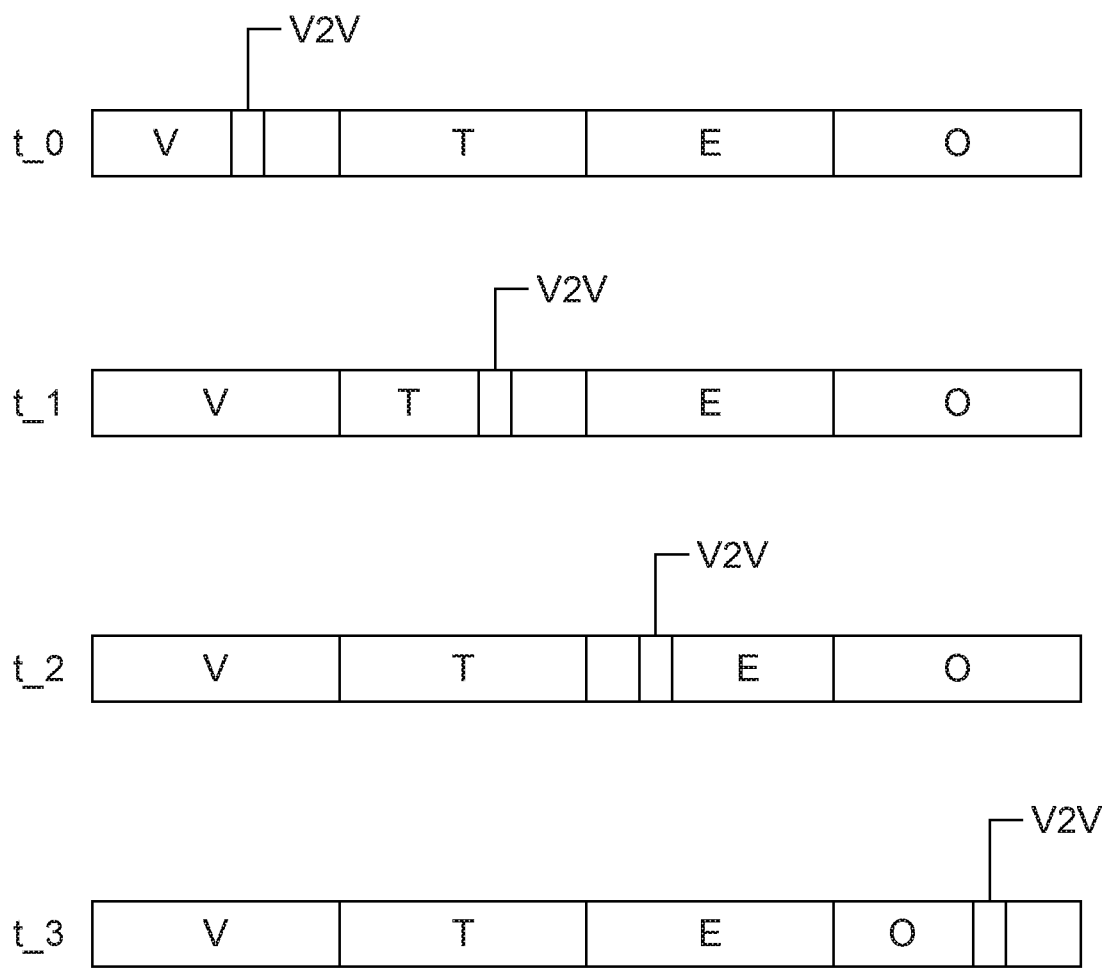
FIG. 4 illustrates in a second embodiment how a part of a dedicated spectrum in the LTE frequency bands, which is allocated for V2V communication, is shifted from provider spectrum to provider spectrum per time slice.
Figure 5:
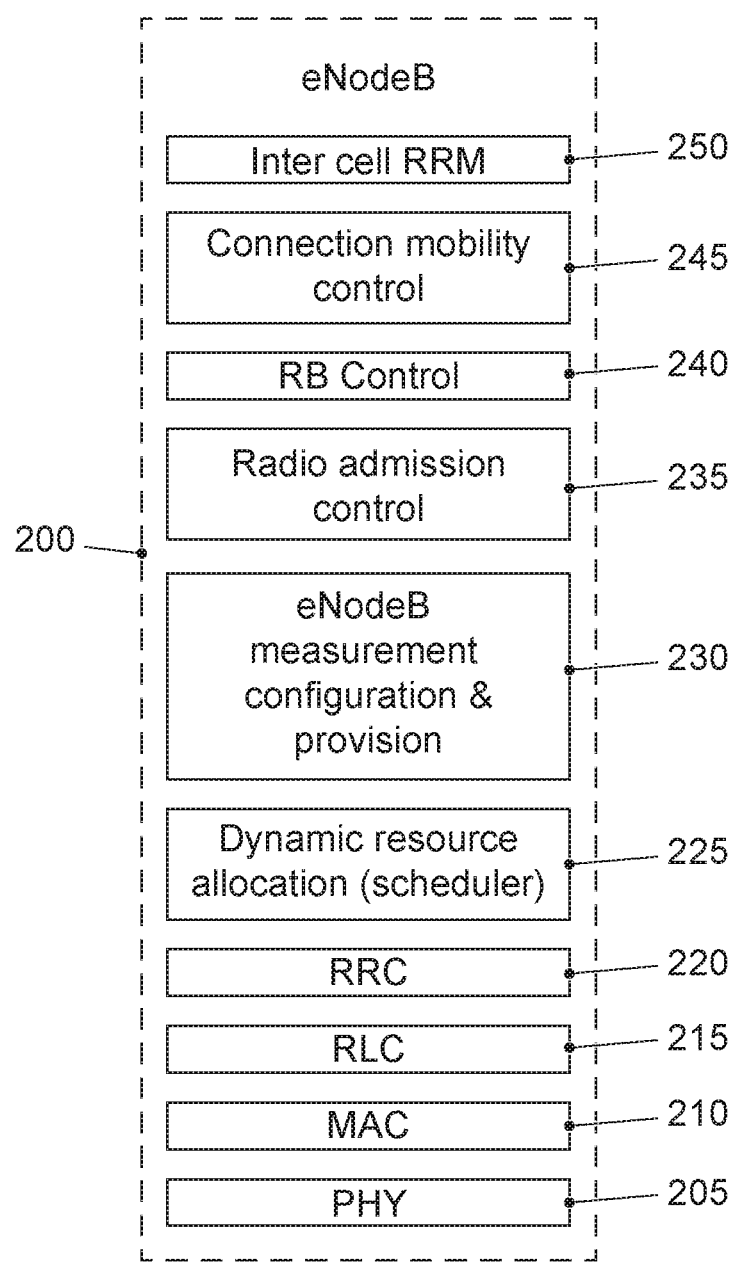
FIG. 5 shows the functional entities of the control plane and the radio protocol layers of an LTE base station.

In contrast, another disclosed embodiment according to FIG. 4 could briefly be called common "out-of-coverage" V2V communication mode. For the common "out-of-coverage" V2V communication mode the selected V2V spectrum which one provider allocates in a time slice $t\_0$ to $t\_3$, is not further divided into portions. This is illustrated in FIG. 4. All the vehicles from the different providers could access this spectrum in a "common opportunistic access" manner, i.e., the scheduler in the base station 20 of the provider whose turn it is to provide resources for V2V communication would not need to schedule resources in the part of the spectrum for all vehicles from all providers. The vehicles themselves would try to get access to a resource with a corresponding access technique such as, for example, used in a WLAN system. One example for such a technique is CSMA-CA corresponding to carrier sense multiple access—collision avoidance. This mode is not a pure opportunistic access since all vehicles must be able to know when they actually have to change the allocated spectrum. In a variation where the pattern for a spectrum change is predetermined and known for all vehicles, then this communication mode would be rightly called "out-of-coverage" mode for such type of special case.

In another disclosed embodiment, there should be at least some kind of way to receive the information about the next spectrum band to jump in (of course, this information can be delivered in the currently used spectrum or alternatively also in a different spectrum of a given provider). This is not a pure "out-of-coverage" mode as indicated above.

Additionally, for the case when the whole currently dedicated V2V spectrum is being shared among the vehicles from all providers, one operator may be scheduled to take a responsibility to coordinate resources for each vehicle among all operators. Such scheduled responsibility for the operator may also be changed over time similarly to the change of allocated spectrum, described above. This embodiment then is called "common in-coverage mode". The spectrum change would be in the same manner as depicted in FIG. 4.

Therefore, in a more precise wording in summary, the following groups of communication modes are embodiments of the disclosure:

"In-coverage non-opportunistic" mode—for the first case when vehicles in the allocated spectrum remain under eNodeB control of their provider. Here two options are mentioned:

Exactly, as described in the first case corresponding to what is illustrated in FIG. 3

Or when the whole dedicated spectrum is shared among all vehicles and the control is done by scheduled operator, for example, who owns the current dedicated V2V spectrum. Then, at time instance t_1, the control will be changed to another operator together with a change of dedicated spectrum as described above and illustrated in FIG. 4

"Out-of-coverage", or "Common opportunistic access" as described above and illustrated in FIG. 4, where no coordination of resources by any provider is done at the common dedicated V2V spectrum Mobile devices according to the current LTE specifications are capable of operating in spectrum bands up to 20 MHz without carrier aggregation and in multiples of 20 MHz if the carrier aggregation technique is enabled.

The task of allocating transmission resources is reserved to a scheduler who corresponds to a management unit inside a base station eNodeB 20. Scheduling will be performed for the uplink communication direction downlink communication direction and the sidelink communication direction, where the sidelink communication is used for V2V communication.

The task of allocating transmission resources is reserved to a scheduler who corresponds to a management unit inside a base station eNodeB. FIG. 4 shows a protocol stack of such a base station eNodeB. With reference number 200 the whole protocol stack with the different layers is denoted. Reference number 205 refers to the Physical Layer (Layer 1) of the ISO/OSI 7-layer model of data communication. The Data Link Layer (Layer 2) in LTE is comprised of the sublayers 210 Medium Access Control layer, 215 Radio Link Control layer and 220 Radio Resource Control layer. Above that the functionality of the Network Layer (Layer 3) is provided by the above mentioned scheduler component, i.e., the management unit which is responsible for resource allocation. This component has reference number 225. Above it there is a layer 230 which is responsible for evaluating measurement reports from the various stations associated with the base station and performs configuration of the network. With reference number 235 a Radio Admission Control Layer RAC is denoted. Above it an RBC layer corresponding to Radio Bearer Control layer has reference number 240. Further above are the layers Connection Mobility Control CMC 245 and Inter Cell Radio Resource Management RRM 250. The different layers and sub-layers shown in FIG. 4 are described in the standard. It is referred to the specification ETSI TS 136 211 V13.1.0. with the title LTE; Evolved Universal Terrestrial Radio Access (E-UTRA); Physical Channels and Modulation (3 GPP TS 36.211 Virgin 13.1.0 Release 13).

Of further interest for the subject application is the layer Dynamic Resource Allocation, which corresponds to the scheduler 225. Therefore, in the following further explanation is provided mainly to the scheduler 225. Regarding the other layers, it is expressively referred to the LTE standard for further details also in view of the disclosure.

For the "in-coverage" mode, the scheduler 225 of provider V who's turn it is to schedule resources will broadcast to the vehicles 30V logged-on to the base station 20V the information which section V2V_V of its dedicated spectrum is reserved for the direct V2V communication among the subscribers of this provider. Such information may be transferred over the downlink broadcast control channel BCCH of the LTE mobile communication system. Likewise, the scheduler 225 of provider T will broadcast to the vehicles 30T logged-on to the base station 20T the information which section V2V_T of its dedicated spectrum is reserved for the direct V2V communication among the subscribers of provider T. In a similar manner the other providers would inform their participants about which sections those participants would need to use for V2V communication. In the "in-coverage" mode each base station will schedule the resources for V2V communication of its participants on its own or this is handled by one base station for all participants. In the latter case, however it is required that all vehicles need to be logged-on to this base station including the ones from the other providers. In the "out of coverage" mode all vehicles from different providers access resources in the common dedicated spectrum in an opportunistic manner.

If all vehicles in the common dedicated spectrum are still being scheduled by a single operator, then such a scheduling task possesses very high requirements on the scheduler's efficiency and performance, since such provider has to be able to handle many more users than it actually has in its own network. Additionally, the provider has to take legal responsibility for all vehicles if some serious accident happens due to a communication or scheduling problem of a given provider.

For further details regarding the scheduling operation in the LTE mobile communication system also for the purpose of further disclosure of the subject proposals it is referred expressively to the LTE specifications ETSI TS 136 213 and ETSI TS 136 300 LTE; Evolved Universal Terrestrial Radio Access (E-UTRA) and Evolved Universal Terrestrial Radio Access Network (E-UTRAN); Overall description; Stage 2; 3GPP TS 36.300 version 12.9.0 Release 12.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to, and executed by, a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments which are also considered to belong to the disclosure.

REFERENCE SIGN LIST

10 Internet
20 Base Station
30 Vehicle
31 On-Board Unit
40 Evolved Packet Core EPC
V Dedicated Spectrum
T Dedicated Spectrum
E Dedicated Spectrum
O Dedicated Spectrum
t_0 Time Slice
t_1 Time Slice
t_2 Time Slice
V2V Part of Dedicated Spectrum
V2V_V Section of Part of Dedicated Spectrum
V2V_T Section of Part of Dedicated Spectrum
V2V_E Section of Part of Dedicated Spectrum
V2V_O Section of Part of Dedicated Spectrum
200 Protocol Stack
205 Physical Layer
210 Medium Access Layer
215 RLC Layer
220 RRC Layer
225 Scheduler
230 Measurement, Configuration & Provision Layer
235 RAC Layer
240 RBC Layer
245 CMC Layer
250 RRM Layer

The invention claimed is:

1. A method for resource allocation in a mobile communication system, the method comprising:
    facilitating communication among a plurality of mobile communication providers' base stations and a plurality of mobile communication provider participants, wherein each mobile communication provider has assigned a dedicated spectrum for resource allocation for its own participants, wherein the participants from the plurality of mobile communication providers communicate directly with each other;
    allocating, by each mobile communication provider, a part of its dedicated spectrum for the direct communication among the participants from the plurality of mobile communication providers;
    dividing a part of a dedicated spectrum of a mobile communication provider for the direct communication among the participants from the plurality of mobile communication providers into sections, with each provider of the plurality of mobile communication providers having been assigned at least one section of the part of the dedicated spectrum of the mobile communication provider; and
    shifting resource allocation management functionality for allocating a part of the dedicated spectrum for the direct communication among the participants from the plurality of providers from provider to provider from time slice to time slice.

2. The method of claim 1, wherein the resource allocation functionality is shifted from provider to provider from time slice to time slice in a round robin state, maximum rate queuing state or proportionally fair queuing state.

3. The method of claim 1, further comprising each mobile communication provider announcing to all other mobile communication providers which part of its dedicated spectrum is reserved for the direct communication among the participants from the plurality of mobile communication providers.

4. The method of claim 3, further comprising each mobile communication provider announcing to its own participants which section of the announced part of the dedicated spectrum is reserved for the direct communication among its own participants.

5. The method of claim 3, further comprising each mobile communication provider scheduling resources in its section of the part of the dedicated spectrum for its own participants by a scheduler in the mobile communication provider's base station.

6. The method of claim 3, further comprising each mobile communication provider scheduling resources in the part of the dedicated spectrum for its own participants and the participants of the other mobile communication providers by a scheduler in the mobile communication provider owned base station.

7. A base station configured to divide part of a dedicated spectrum of a mobile communication provider for direct communication among participants from a plurality of mobile communication providers into sections according to a method comprising:
    assigning each mobile communication provider at least one section of the part of the dedicated spectrum;
    the base station having a scheduler for scheduling resources in its assigned part of the dedicated spectrum for solely its own participants or its own participants plus the participants of the other mobile communication providers.

8. The base station of claim 7, wherein resource allocation management functionality for allocating a part of the dedicated spectrum for the direct communication among the participants is shifted from the plurality of providers from provider to provider from time slice to time slice.

9. The base station of claim 8, wherein the resource allocation functionality is shifted from provider to provider from time slice to time slice in a round robin state, maximum rate queuing state or proportionally fair queuing state.

10. The base station of claim 8, wherein each mobile communication provider announces to all other mobile communication providers which part of its dedicated spectrum is reserved for the direct communication among the participants from the plurality of mobile communication providers.

11. The base station of claim 8, wherein each mobile communication provider announces to its own participants which section of the announced part of the dedicated spectrum is reserved for the direct communication among its own participants.

12. The base station of claim 11, wherein each mobile communication provider scheduling resources in its section of the part of the dedicated spectrum for its own participants by a scheduler in the mobile communication provider's base station.

13. The base station of claim 11, wherein each mobile communication provider scheduling resources in the part of the dedicated spectrum for its own participants and the participants of the other mobile communication providers by a scheduler in the mobile communication provider owned base station.

* * * * *